June 8, 1965     F. M. FRANKO     3,187,406
CUTTING INSERT
Original Filed June 14, 1963
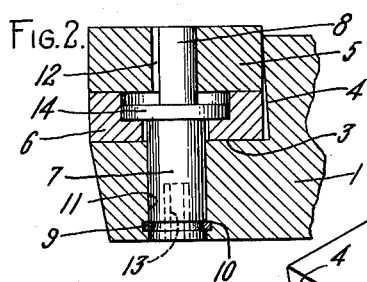
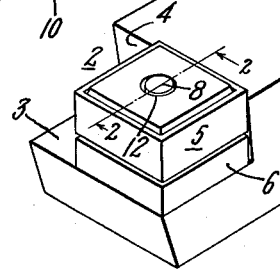
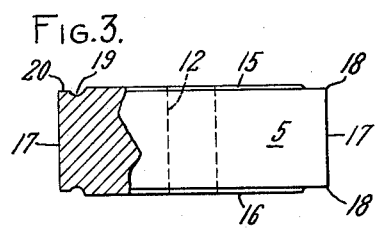
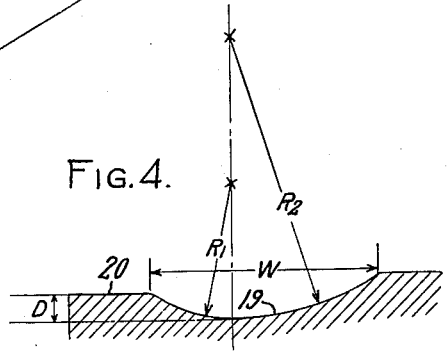
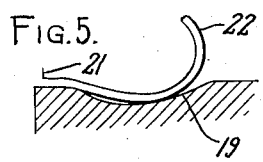
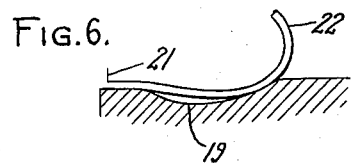
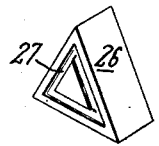
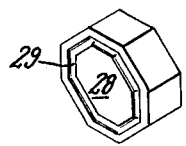
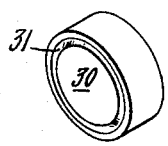
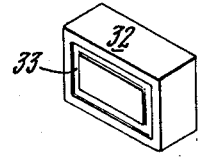
INVENTOR
FREDRICK M. FRANKO
BY
HIS ATTORNEY

United States Patent Office 3,187,406
Patented June 8, 1965

3,187,406
CUTTING INSERT
Frederick M. Franko, Johnstown, N.Y., assignor to General Electric Company, a corporation of New York
Continuation of application Ser. No. 287,891, June 14, 1963. This application Dec. 16, 1964, Ser. No. 421,149
3 Claims. (Cl. 29—95)

This is a continuation of application Serial No. 287,891 filed June 14, 1963, now abandoned.

This invention relates to a disposable cutting insert of the type used in a cutting tool for the machining of metals and, more specifically, to a disposable cutting insert which contains an integral chip controlling groove therein and to a cutting tool provided with such insert.

In the machining of metal with cutting tools, a ribbon of metal is removed during the machining operation. This ribbon of metal is redirected as it strikes the cutting tool, the workpiece, portions of the tool post in which the cutting tool is held or other elements in proximity to the cutting tool and is broken into short, controllable lengths or chips. This ribbon of metal must be controlled and broken into chips to avoid interference with the machining operation, to avoid safety hazards to the operator and for ease of handling.

Most cutting tools in use today of the type in which an insert is mechanically held in a cutting toolholder possess an element which functions to direct the ribbon of removed metal or chips in a controlled direction. Such chip controlling elements, frequently referred to somewhat inaccurately as chip breakers, are usually in some way associated with the clamp which holds the insert in place. The clamp either serves to hold a chip controlling element in place or, alternatively, a surface of the clamp itself performs the chip controlling function.

There has recently been developed a cutting tool in which the cutting insert is releasably held in the cutting tool shank by an eccentric pin, thus eliminating the necessity for any mechanical clamping elements. An important advantage of such cutting tools is their simplicity in design and reduced number of components, advantages which would, in large measure, be defeated by the addition of separate clamping or chip controlling elements.

It is, accordingly, a primary object of this invention to provide a disposable insert for a cutting tool which insert functions to control chip direction efficiently and effectively.

It is an additional object of this invention to provide a cutting tool of great simplicity in design and function in which the cutting insert is utilized to control chip direction and which neither requires nor possesses separate chip controlling elements.

These and other objects will become apparent from the discussion of the invention which follows in conjunction with the accompanying drawings in which:

FIGURE 1 is a perspective view of one embodiment of a cutting tool of the invention;

FIGURE 2 is a view partly in cross-section and partly in elevation of the cutting tool head taken along the line 2—2 of FIGURE 1;

FIGURE 3 is an enlarged elevational view, partly broken away, of the cutting insert shown in the cutting tool of FIGURES 1 and 2;

FIGURE 4 is a still further enlarged fragmentary view of the cutting insert of FIGURE 3 drawn to scale and showing in detail the configuration of a chip controlling groove of the invention.

FIGURES 5, 6 and 7 are schematic views showing the manner in which a chip strikes the surface of a cutting insert of the invention.

FIGURES 8, 9, 10 and 11 show different embodiments of cutting inserts falling within the scope of the invention.

The present invention involves the discovery that by providing the cutting insert with a chip controlling groove of certain specific configuration, the cutting insert itself will function effectively to control chip direction while still retaining the indexible, invertible features of a disposable insert. The critical design features of the cutting insert, described more fully hereinafter, include the use of a groove which is continuous and which has a dual radius—the back radius is greater than the forward radius. In addition, a circumferential land exists between the groove and the cutting edge which is offset from the remaining surface of the face of the insert.

Referring to the drawings, FIGURES 1 and 2 show one embodiment of a cutting tool of the invention. The cutting tool comprises a shank 1 of a heat-treated, tough steel having an open recess 2 at one end thereof. The recess has two supporting surfaces, base 3 and a shoulder or rear supporting surface 4, for supporting a cutting insert 5 and a seat 6 for the cutting insert. The insert 5 and seat 6 are held in the open recess of the shank by cam pin 7 of high alloy, tough steel having an eccentric extension 8. The cam pin 7 is anchored in the shank 1 by spring clamp 9 which locks in a counterbore 10 in the inner diameter of the hole 11 of the shank. The eccentric extension 8 of cam pin 7 fits into a central hole 12 in insert 5. When the cam pin is rotated in a first direction, the eccentric extension forces insert 5 against rear shoulder 4 of the shank and the insert is locked in place by frictional forces alone between the cam pin, insert and rear shoulder of the shank. By rotating the cam pin in the opposite direction, the insert is loosened and may be freely rotated and removed for indexing and inversion of the cutting insert. The cam pin is conveniently rotated by the insertion of an Allen wrench in a recess 13 in pin 7. Annular flange or collar 14 in combination with spring clip 9 retains the cutting seat 6 in place during indexing and removal of the seat. The cam pin and seat are easily removed from the shank by a light tap with a pointed tool against the bottom of the pin.

An important feature of the present invention resides in the fact that it is useful in cutting inserts of the so-called disposable type; that is, inserts possessing a plurality of useful cuttings edges. In the case of the square insert shown in FIGURE 1, there are eight available cutting edges. When one of the edges has become dull or otherwise not further usable, the insert is indexed by loosening the cam pin and rotating the insert 90°. When all four upper cutting edges have been used, the insert is inverted and four additional cutting edges are available. For full utilization of such disposable inserts, the cutting tool must provide chip control when each of the cutting edges is in cutting position. The present invention provides a cutting insert having a chip controlling groove of such configuration and dimensions that effective chip control is provided when any of the cutting edges of the insert is in cutting position. The invention therefore makes possible a cutting tool for disposable inserts possessing all of the functions of prior cutting tools but having significantly fewer components and of much greater simplicity in design.

FIGURES 3 and 4 illustrate in greater detail the configuration and design of the cutting insert of the invention. As there shown, the cutting insert has parallel faces 15 and 16, peripheral or edge surfaces 17 and a central hole or aperture 12 to receive eccentric extension 8 of pin 7. Peripheral surfaces 17 and central aperture 12 are parallel to each other and both are perpendicular to parallel surfaces 15 and 16. The peripheral surfaces and the parallel faces meet to form a plurality of cutting edges 18 (see FIGURE 1), each of which is of the same length. The cutting insert possesses a continuous, curved, chip controlling groove 19 on both of its parallel faces. The groove possesses a constant cross-sectional shape. It should, of course, be understood that at the corners of a square or other polygonal-shaped insert, the cross-sectional shape may deviate somewhat where the groove changes direction. Groove 19 is spaced equidistant from the cutting edges 18 so that a circumferential land 20 is formed on each face of the cutting insert between groove 19 and cutting edge 18. As can be seen from the drawings, the surface of land 20 is offset or lower than the remaining surface of the parallel face. Thus, as most clearly shown in FIGURES 3 and 4, the axial depth of the land of the cutting insert adjacent the cutting edge is less than the axial depth of the central land of the cutting insert. (The axial direction as used herein is a direction parallel to aperture 12 in the insert.) The presence of circumferential land 20 is a necessary feature of the invention. Its omission has been found to result in insufficient strength of cutting edges 18. Moreover, if the land is not offset as described, the insert will tend to fracture during cutting operations because of contact between the land and the supporting surface of the recess of the shank or the supporting surface of the seat on which the cutting insert rests.

Specific dimensions of the various configurations of the insert will to a certain extent be dependent on the feed, speed and depth of cut, the nature of the material being machined and on other machining operation variables. However, certain of such dimensions have been found to have a fixed range of values which are useful for a wide variety of cutting conditions and these preferred dimensions will therefore be set forth.

As shown in FIGURE 4, the depth D of the groove as measured from the surface of the circumferential land to a plane tangent to the bottom of the groove is preferably from .001 to .010 inch and even more preferably from .003 to .006. The groove width W is a function of the width of the circumferential land but preferred values for these dimensions are .035 to 0.10 inch groove width and .003 to .040 inch land width.

The front radius $R_1$ of the groove, the radius nearest the cutting edge, is preferably from .040 to .050 inch. The dimension of the inner or rear radius $R_2$, the radius furthest removed from the cutting edge, is a function of the dimensions of the groove and of the front radius but is greater than radius $R_1$ as illustrated in FIGURE 4. The use of a dual radius (where $R_2$ is greater than $R_1$) has been found to be superior to a single radius in its chip controlling function during machining operations. Reference herein to a front and rear radius is intended to refer to the predominant slope of the groove. It may be desirable to modify slightly the slopes of the beginning and terminal portions of the groove and thus in effect to have "four radii." In any event, the inner or rear portion of the groove should have a shallower slope than the forward portion, or stated otherwise, the groove should have at least two radii in which rear radius $R_2$ is greater than front radius $R_1$.

Where brittle materials, such as cast iron, are machined, chip control is rarely a problem. Such materials produce short, trouble-free chips when machined even at high rates of feed. However, for the machining of steel and other ductile materials, chip control is mandatory. About 80 percent of all machining operations fall in the latter category in which chip control is necessary. The manner in which chips are redirected or controlled in accordance with the invention is illustrated in FIGURES 5, 6 and 7 at three different feed rates. Such feed rates ordinarily determine the manner in which the chip contacts the surface of the cutting insert. Feed rate, a measure of the speed of metal removal, is ordinarily classified as either light, medium or heavy. At light feeds of approximately .006 to 0.016 inch per revolution, the removed ribbon of material or chip 22 contacts both the near and far radii of the chip controlling groove 19 as shown in FIGURE 5. The chip is then redirected and broken into chips upon contact with workpiece 21 or other portions of the tool post or cutting tool. At medium feeds of approximately .017 to .032 inch per revolution, the removed metal 22 contacts the far radius and/or back edge of groove 19 as shown in FIGURE 6, and is redirected and broken into chips as set forth above. At heavier feeds in excess of about .032 inch per revolution, the removed material strikes the upper parallel face of the insert beyond the groove as shown in FIGURE 7, and is thereafter broken into chips.

Accordingly, the chip controlling groove of the present invention functions to control the flow and direction of chips so that the chips are effectively broken in a fully satisfactory manner. Moreover, the result is accomplished without the presence of overhead clamping elements which tend to obstruct and interfere with chip flow as the chips sweep across the face of the cutting insert. Moreover, such clamps are frequently damaged or fractured at the heavier feed rates.

Chip controlling grooves of the invention may be utilized in cutting inserts of other than the configuration illustrated in FIGURES 1 through 4. Other illustrative cutting insert shapes are illustrated in FIGURES 8, 9, 10 and 11. FIGURE 8 shows a triangular insert 26 containing chip controlling groove 27. FIGURE 9 shows cutting insert 28 in the shape of a regular octagon containing chip controlling groove 29. FIGURE 10 shows a circular insert 30 containing a chip controlling groove 31. FIGURE 11 shows a rectangular insert 32 containing chip controlling groove 33. In all instances, the dimensions and configuration of the chip controlling groove and the land conform to those set forth for the groove of FIGURES 1 through 4.

The invention thus provides for successful control of chip formation in a cutting tool of very great simplicity. A single insert has been found to be capable of chip control over a wide range of materials, feeds and depths of cut thus resulting in greater versatility of use of a single cutting tool-insert combination. Moreover, the complete symmetry of the insert configuration enables one style of insert to serve for both right- and left-hand cutting and to control chips with equal effectiveness in both types of cutting.

What I claim as new and desire to secure by Letters Patent of the United States is:

1. A disposable cutting insert having parallel faces and a peripheral surface along the axis thereof,
    said parallel faces and peripheral surface meeting to form a plurality of cutting edges,
    each of said parallel faces having a continuous, curved, chip-controlling groove therein of uniform, cross-sectional configuration,
    said groove being spaced equidistant from said cutting edges to form a central island and a circumferential land on said parallel faces,
    the axial depth of said land being less than the axial depth of said island and
    the portion of the groove adjacent the land having a first radius, the remaining portion of the groove having a second radius greater than the first radius.

2. An indexible and invertible cutting insert having parallel faces, a peripheral surface normal thereto and along the axis thereof and an axial hole therein,
    said parallel faces and peripheral surface meeting to form a plurality of cutting edges of equal length,
    each of said parallel faces having a continuous, curved, chip controlling groove therein of uniform, cross-sectional configuration,
    said groove being spaced equidistant from said cutting edges to form a central island and a circumferential land on said parallel faces,
    the axial depth of said land being less than the axial depth of said island and
    the portion of the groove adjacent the land having a first radius, the remaining portion of the groove having a second radius greater than the first radius.

3. A disposable cutting insert having parallel faces and a peripheral surface along the axis thereof,
  said parallel faces and peripheral surface meeting to form a plurality of cutting edges,
  each of said parallel faces having a continuous, curved, chip-controlling groove therein of uniform, cross-sectional configuration,
  said groove being spaced equidistant from said cutting edges to form a central island and a circumferential land on said parallel faces,
  the axial depth of said land being less than the axial depth of said island.

No references cited.

ANDREW R. JUHASZ, *Primary Examiner.*